(12) United States Patent
Herriott et al.

(10) Patent No.: US 7,474,653 B2
(45) Date of Patent: Jan. 6, 2009

(54) DECISION CACHE USING MULTI-KEY LOOKUP

(75) Inventors: Guy Herriott, Placerville, CA (US); Michael T. Roeder, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 854 days.

(21) Appl. No.: 10/729,518

(22) Filed: Dec. 5, 2003

(65) Prior Publication Data

US 2005/0125424 A1    Jun. 9, 2005

(51) Int. Cl.
*H04L 12/56* (2006.01)

(52) U.S. Cl. .................................... 370/389

(58) Field of Classification Search ............... 370/389, 370/351–430, 422, 428, 412, 392, 394, 395.3, 370/395.31, 395.4, 395.42, 395.32, 401; 711/216, 220, 221; 709/238, 242
See application file for complete search history.

(56) References Cited

U.S. PATENT DOCUMENTS

| | | | | |
|---|---|---|---|---|
| 5,414,704 A | * | 5/1995 | Spinney ..................... | 370/389 |
| 5,610,905 A | * | 3/1997 | Murthy et al. .............. | 370/401 |
| 5,638,377 A | * | 6/1997 | Quinquis et al. ........... | 370/392 |
| 5,796,715 A | | 8/1998 | Patterson et al. | |
| 5,978,951 A | * | 11/1999 | Lawler et al. ............... | 370/401 |
| 6,023,466 A | * | 2/2000 | Luijten et al. .......... | 370/395.31 |
| 6,606,322 B2 | | 8/2003 | Mitchem et al. | |
| 6,643,261 B2 | | 11/2003 | Kadambi et al. | |
| 6,798,751 B1 | * | 9/2004 | Voit et al. .................... | 370/252 |
| 6,845,094 B1 | * | 1/2005 | Zhang ......................... | 370/349 |
| 6,862,287 B2 | * | 3/2005 | Brown ........................ | 370/401 |
| 7,155,516 B2 | * | 12/2006 | Musoll et al. ............... | 370/392 |
| 2002/0048269 A1 | * | 4/2002 | Hong et al. ................. | 370/389 |
| 2002/0085554 A1 | * | 7/2002 | Park ............................ | 370/389 |
| 2002/0196796 A1 | * | 12/2002 | Ambe et al. ................ | 370/401 |
| 2003/0214956 A1 | * | 11/2003 | Navada et al. .............. | 370/401 |
| 2005/0111446 A1 | * | 5/2005 | Greaves et al. ............. | 370/389 |

* cited by examiner

*Primary Examiner*—Hassan Kizou
*Assistant Examiner*—Joshua Smith

(57) ABSTRACT

One embodiment disclosed relates to a method of processing a data packet. The data packet is received at a network device. A determination is made as to whether a multiple-key decision cache is hit by the data packet. At least one cached action is applied if the decision cache is hit. The data packet is processed using software routines if the decision cache is missed. Another embodiment disclosed relates to a network apparatus. The network apparatus includes a plurality of ports configured to receive data packets, and software routines are configured to process the data packets. Logic in the apparatus is configured to determine whether a multiple-key decision cache is hit by a data packet, to apply at least one cached action if the decision cache is hit, and to process the data packet using the software routines if the decision cache is missed.

19 Claims, 9 Drawing Sheets

| Entry valid flag 402 | Source VID 404 | Source IP address 406 | Destination IP address 408 | Other fields 410 | Action 412 |
|---|---|---|---|---|---|
| | | | | | |
| | | | | | |
| | | | | | |
| | | | | | |

FIG. 4

DECISION CACHE USING MULTI-KEY LOOKUP

BACKGROUND OF THE INVENTION

1. Field of the Invention

The present invention relates generally to networking and communications technology.

2. Description of the Background Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in numerous IEEE publications relating to IEEE 802 standards.

Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks.

Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. The newest ethernet is referred to as gigabit ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution.

Referring to the OSI 7-layer reference model discussed previously, and illustrated in FIG. 8, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a forwarding table based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of maintaining routing and ARP (address resolution protocol) tables. Processing speed for layer three switches can be improved by utilizing specialized high performance hardware, and off loading the host CPU so that instruction decisions do not delay packet forwarding.

SUMMARY

One embodiment of the invention pertains to a method of processing a data packet. The data packet is received at a network device. A determination is made as to whether a multiple-key decision cache is hit by the data packet. At least one cached action is applied if the decision cache is hit. The data packet is processed using software routines if the decision cache is missed.

Another embodiment of the invention pertains to a network apparatus. The network apparatus includes a plurality of ports configured to receive data packets, and software routines are configured to process the data packets. Logic in the apparatus is configured to determine whether a multiple-key decision cache is hit by a data packet, to apply at least one cached action if the decision cache is hit, and to process the data packet using the software routines if the decision cache is missed.

BRIEF DESCRIPTION OF THE DRAWINGS

FIG. 4 is a table showing entry fields of a decision cache in accordance with an embodiment of the invention.

DETAILED DESCRIPTION

Figure 1:
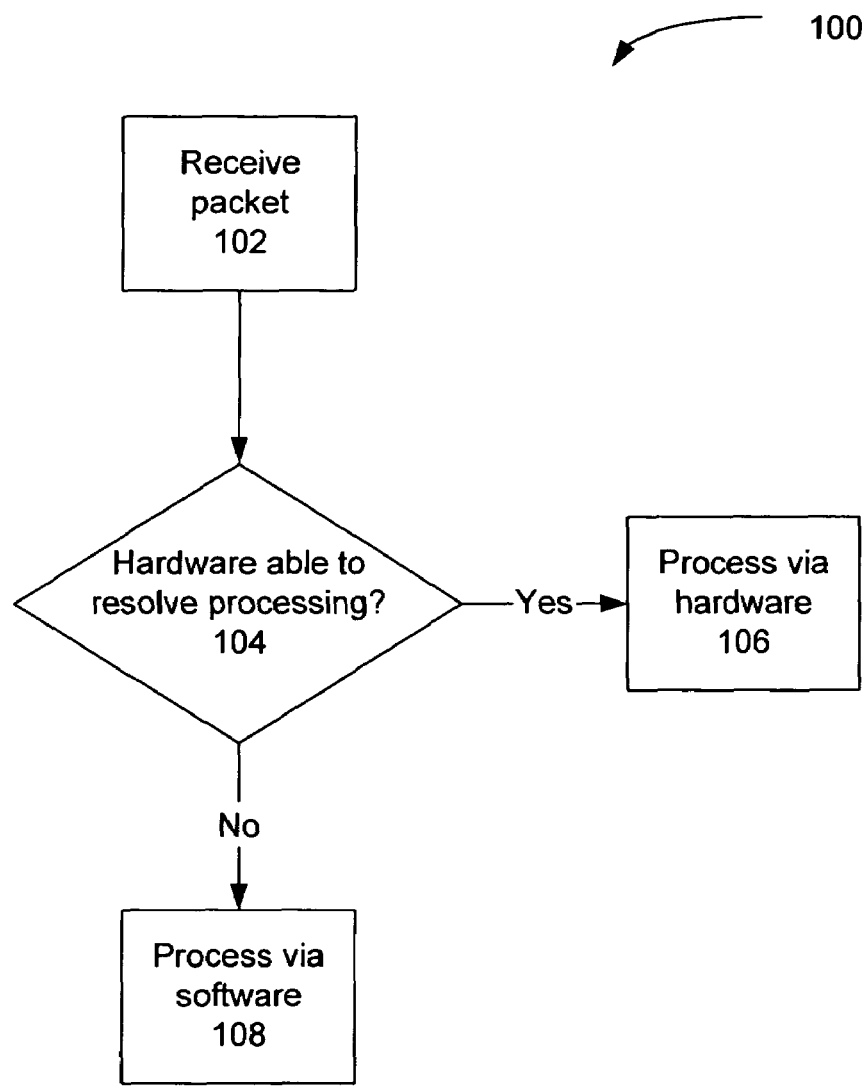
FIG. 1 is a flow chart depicting a prior method of processing a packet at a networking switch.

FIG. 1 is a flow chart depicting a prior method 100 of processing a packet at a networking switch. In this case, the switch includes both hardware and software for processing packets.

Per this method 100, a packet is received 102 via a port at the switch. A determination 104 is made as to whether the hardware logic is able to resolve the processing of the packet. If so, then the packet is processed 106 via the hardware. If not, then the software is used to process 108 the packet.

It is typically desirable for the packet to be processed via the hardware because the hardware processing 106 is generally faster than the software processing 108. However, some packets cannot be successfully processed by the hardware, and those packets are then processed by the slower software routines. In particular, the hardware may not have all the necessary information to process the packet, or the hardware may not be capable modifying the packet as may be necessary. For example, the switch may not be able to modify packets as necessary for network address translation, and so the switch may need to use the software to translate and forward such packets.

The prior method of FIG. 1 improves the performance of a network apparatus with only software processing and no hardware processing. As described in detail below, applicants believe the present invention further improves the performance. In accordance with an embodiment of the invention, a decision cache is used to accelerate packet processing in software when hardware is incapable of processing the packets.

Packets are generally processed by the software using key packet control data, source port information, VLAN (virtual local area network or virtual LAN) information, and the state of various internal tables kept in software. If the software's internal tables remain the same and two packets have the same control data and source information, then the software will perform the same operations on both packets. In a network switch, this occurs often, and the decision cache of the present invention may be used to take advantage of this repetition.

The decision cache may be used to bypass the task of scanning all of the internal tables and applying various algorithms to arrive at a decision on how to process the packet. Instead, a much more rapid evaluation of the packet may be provided by means of a multiple-key lookup to the decision cache using all applicable packet information. If an entry exists for a given packet, then all needed actions may be determined and performed in a fraction of the time it would take otherwise.

For example, the internal tables used by the software routines may include the Network Address Translation (NAT) rule set, Access Control Lists (ACLs), various filter tables, and the layer 2 and layer 3 forwarding tables. The search times on these tables increases rapidly as the number of entries in the tables gets larger. In contrast, the search time for a decision cache implemented in one embodiment may be near constant time complexity. In other words, the decision cache can decide what actions to perform on a packet much faster than if the packet were sent through the software and evaluated with respect to the internal tables.

In one specific embodiment, the decision cache has been implemented on a ProCurve 530x Network Switch available from the Hewlett Packard Company of Palo Alto, Calif. In other embodiments, the decision cache may be implemented on other network apparatus.

Figure 2:
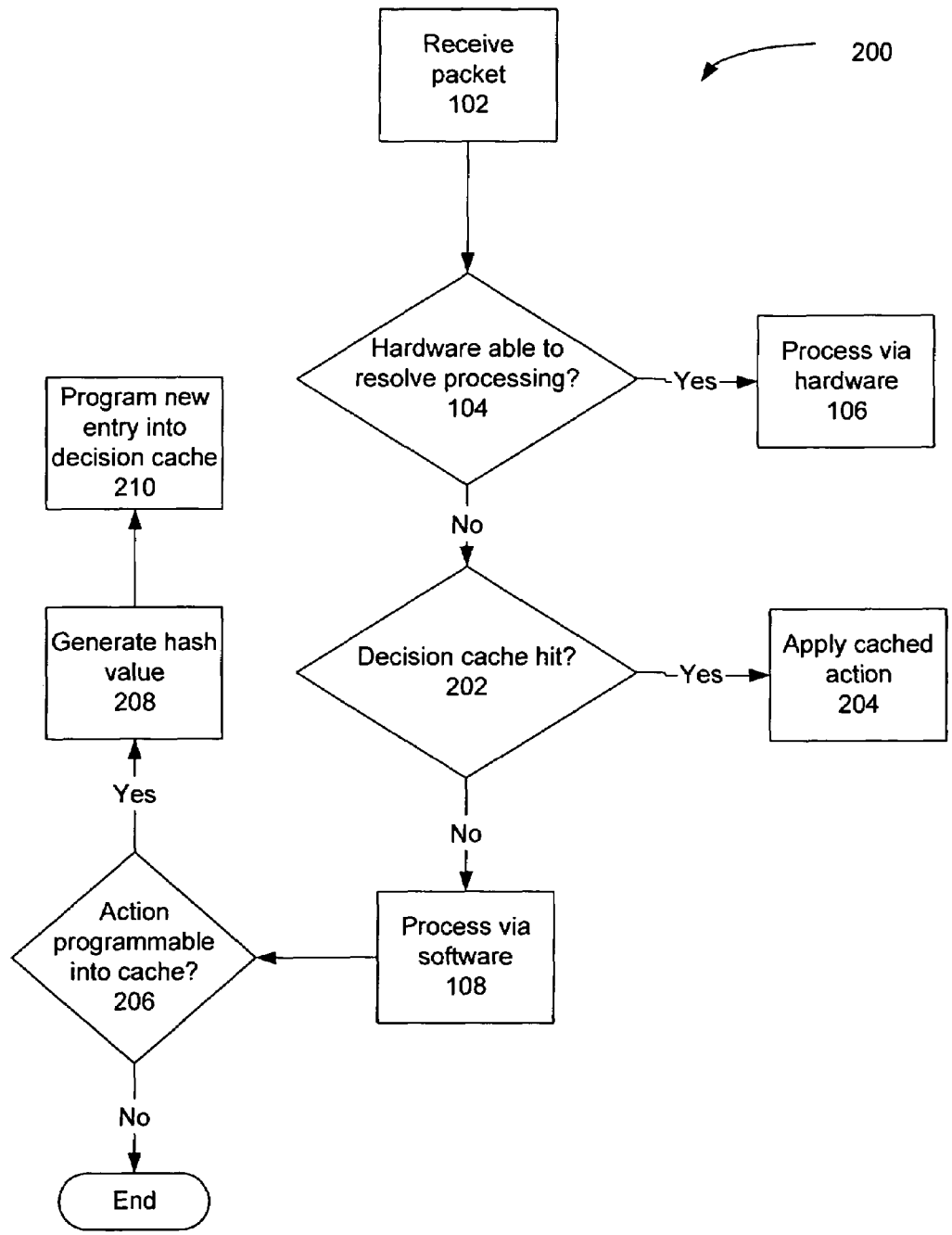
FIG. 2 is a flow chart depicting a method of processing a packet at a networking switch in accordance with an embodiment of the invention.

FIG. 2 is a flow chart depicting a method 200 of processing a packet at a networking switch in accordance with an embodiment of the invention. The method 200 advantageously utilizes a decision cache to substantially improve performance of the switch.

Like the prior method, a packet is received 102 via a port at the switch. A determination 104 is made by hardware logic as to whether the hardware circuitry is able to successfully process the packet. If so, then the packet is processed 106 via the hardware.

However, unlike the prior method, if the hardware cannot successfully process the packet, then a determination 202 is made by software logic as to whether the decision cache is hit. The hit determination 202 preferably uses multiple search keys and is discussed in further detail below in relation to FIG. 3. If such a hit occurs, then the cached action corresponding to the hit is applied 204. For example, the action applied may involve NAT translation and forwarding of the packet. If no hit occurs, then the packet is processed 106 by the more flexible, but slower, software routines. Advantageously, the cached actions may be performed 204 substantially faster than processing 106 the packet using the software routines.

Also unlike the prior method, after a packet 108 is processed by the software, a further determination 206 is made as to whether the action performed by the software in relation to processing the packet is or is not programmable into the decision cache. If the action is programmable into the decision cache, then the decision cache may be updated with a new entry. In accordance with one embodiment of the invention, hash values may be used to index into the decision cache. In such an embodiment, the update may involve generating or retrieving 208 the hash value for the new entry, and then programming 210 the new entry into the decision cache. If the action is not programmable into the decision cache, then no new entry is programmed into the decision cache.

Figure 3:
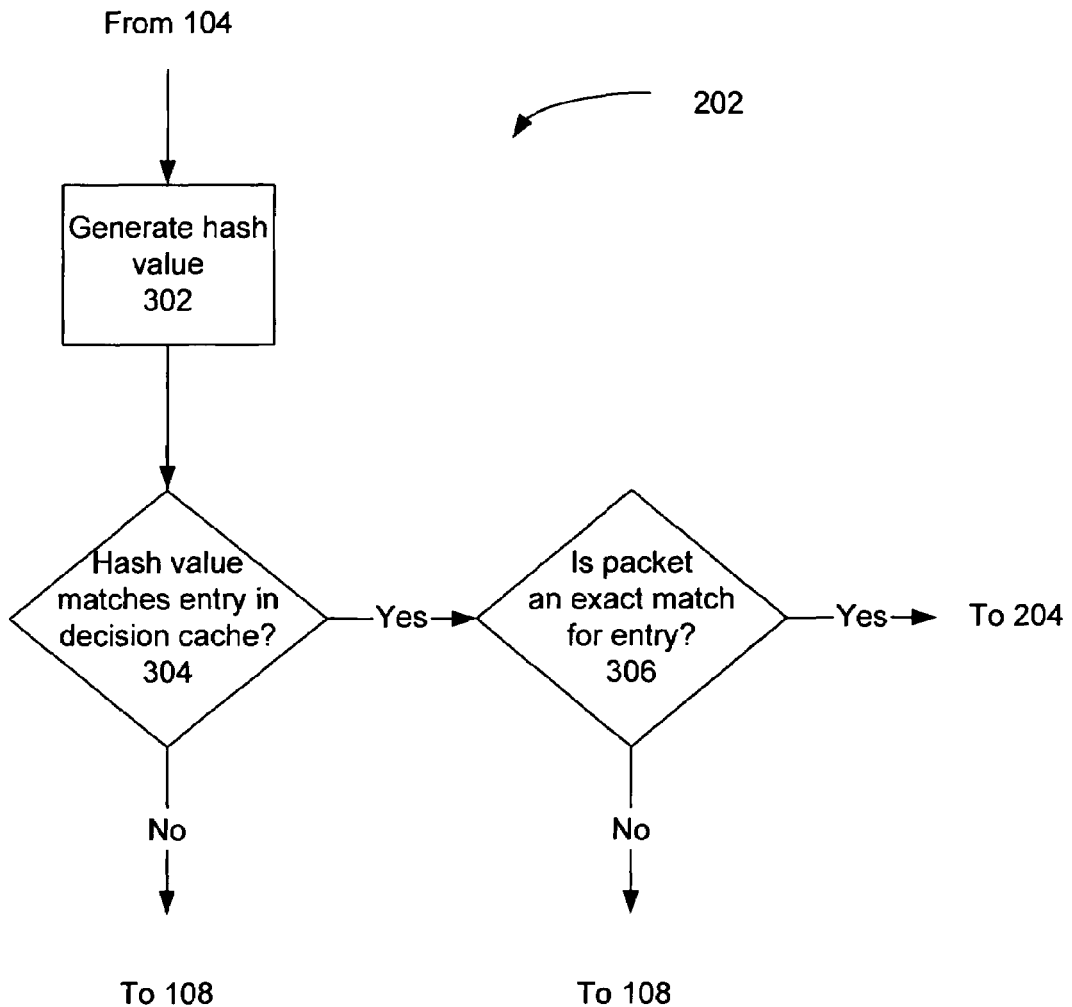
FIG. 3 is a flow chart depicting a process of determining whether there is a decision cache hit in accordance with an embodiment of the invention.

FIG. 3 is a flow chart depicting a process of determining 202 whether there is a decision cache hit in accordance with an embodiment of the invention. This process may be used after it is determined that the hardware cannot resolve the processing.

In one embodiment, a hash value is generated 302 so as to index into the decision cache. For example, the decision cache may be indexed by a hash value comprising the results of an exclusive-or operation performed on destination and source IP (internet protocol) addresses. In that case, the destination and source IP addresses of the packet being processed are exclusive-or'd together to generate the hash value. A determination 304 is then made as to whether or not the hash value generated from the packet corresponds to a valid entry in the decision cache. In other words, whether the hash value generated from the packet successfully indexes into the decision cache. If the hash entry is invalid, then the decision cache is not hit, so the next step is the processing 108 by the software routines.

On the other hand, if the hash entry is valid, then a further determination 306 is made as to whether there is an exact match. In other words, do each of the multiple search keys in the entry match the corresponding data in the packet. For example, the search keys may comprise the source and destination IP addresses and the source VLAN identifier (VID). In that case, in order for there to be an exact match, the source IP address in the entry must match the source IP address in the packet, the destination IP address in the entry must match the destination IP address in the packet, and the source VID in the entry must match the source VID in the packet. If there is no exact match, then the decision cache is not hit, so the next step is the processing 108 by the software routines. If there is an exact match, then decision cache is hit, so the next step is to apply 204 the cached action from the exactly matching entry (i.e. the hit entry).

In alternate embodiments, the decision cache may be implemented in ways other than as described above. For example, the decision cache may not utilize a hash value to index into the table.

FIG. 4 is a table showing entry fields of a decision cache 400 in accordance with an embodiment of the invention. In this specific embodiment, the decision cache 400 includes an entry valid flag 402, a virtual LAN identifier (VID) 404, a source IP address 406, a destination IP address 408, possibly other fields 410, and at least one action field 412. As discussed above, in one embodiment, the hash value generated 302 may be utilized to index into the decision cache 400, thereby speeding up utilization of the decision cache 400.

In a specific embodiment relating to layer 3 switching, the search keys for the decision cache 400 may include the source or incoming VID 404, the source IP address 406, and the destination IP address 408. In other embodiments, other search keys may be used or needed for the decision cache 400. For example, in another embodiment relating to layer 2 switching, the search keys for the decision cache 400 may include source MAC address, source port, and incoming VID.

The action field 412 provides information on the action or actions to be taken upon a hit to an entry in the decision cache. The action is applied to the packet being processed. Advantageously, use of the decision cache 400 enables the appropriate action to be determined more rapidly than it would be under the more complex processing by the software routines. The action specified may comprise multiple separate actions or steps. In some embodiments, multiple action fields may be used.

The decision cache comprises a data structure that can be searched rapidly using applicable packet information. Given a particular packet type, a set of search keys are used to perform the lookup in the decision cache. This allows for a simultaneous evaluation of the packet and thus allows the software to be able to perform a set of actions for that packet. For example, in one specific implementation, the decision cache may support (be used in the processing of) IP (version 4) packets, and the search keys may be fixed to using the inbound VLAN identifier along with the source and destination IP addresses of the packet. Those search keys comprise the pieces of information needed for processing packets for network address translation. In other implementations, other packet types, other search keys, and other actions may be supported. For example, the search keys could be extended to include other packet information such as source port, layer 4 protocol information, TCP/UDP port numbers, TCP/UDP flags, context (layer 7) information, and so on. The actions may be extended, for example, to apply to any other packet forwarding or modification functions implemented by the network apparatus. These functions may include, for instance, ACL security, advanced filtering, network load balancing, server load balancing, network virus detection, and other functions.

Figure 6:
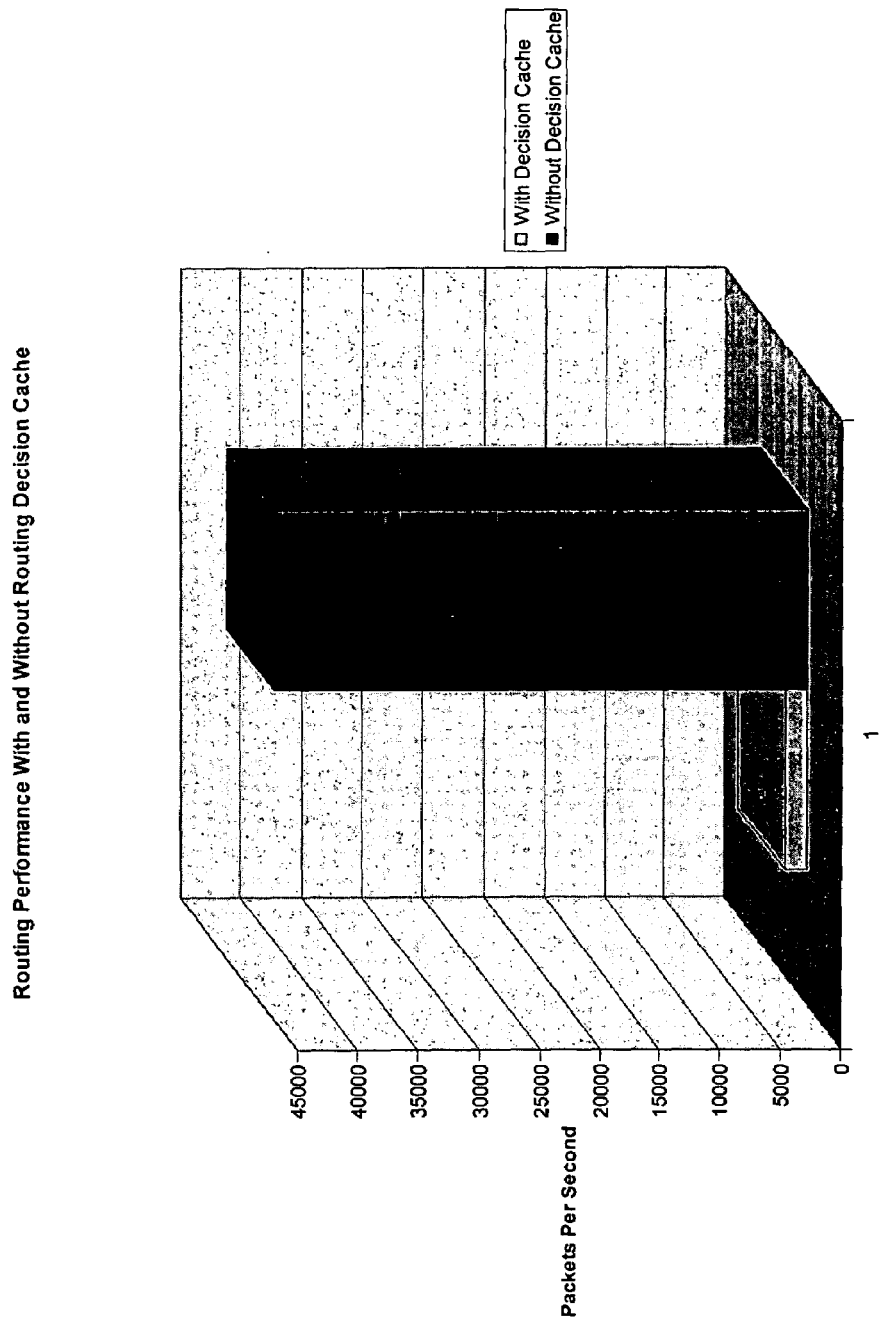
FIG. 6 is a bar chart showing forwarding performance improvement in accordance with an embodiment of the invention.

In one specific embodiment, the decision cache may be implemented as a 256-entry hash table without retries. This provides a constant time lookup for packets that match entries in the cache. When a routable packet is received by software, it is first compared against the decision cache to determine if it can rapidly perform all of the actions necessary for the packet and so advantageously avoid the tremendous amount of processing that would be needed otherwise. To do this, the network apparatus takes the search keys from the packet (for example, inbound VID, destination IP and source IP addresses) and generates a hash value from these by applying a hash function to the IP addresses (for example, the hash function may be a simple exclusive-or operation on the bits of the IP addresses). The apparatus then uses the hash value as an index into the array of 256 decision cache entries and compares the entry at the hash value location in the hash table to see if the search keys of the packet are an exact match for the search keys in the hash table entry. If the packets search data matches, then the decision cache contains the actions needed to be performed on the packet. Per this embodiment, the actions may include forwarding packets, dropping packets, and performing NAT translation on packets. This embodiment resulted in an apparatus with significantly improved performance for packets that can be processed using the decision cache. Without the decision cache, forwarding performance was measured to be about 1,800 packets per second. Using the decision cache, the forwarding performance for packets that match a cache entry was measured to be about 44,000 packets per second. This demonstrated performance improvement is illustrated in FIG. 6.

In one specific embodiment, the decision cache may be programmed on an as-needed basis. For example, the system may be configured such that whenever a packet that needs NAT translation is routed by the software forwarding stack (i.e. not by the hardware and without a hit to the decision cache), then an entry is programmed into the decision cache with search keys from the packet and the actions performed on the packet. It is expected that many more packets with the same search keys may be received, and once the decision cache has been programmed to deal with these packets, then the software forwarding stack may be bypassed, and the appropriate actions for these packets may be quickly determined using the decision cache.

The decision cache also should be maintained. For example, the decision cache will not necessarily remain valid if the software's internal tables are changed. If, for example, the forwarding information for a packet with a cache entry is changed, and the decision cache is not updated to reflect this change, then the decision cache would cause subsequent matching packets to use the old route and hence be routed incorrectly. For this reason, the decision cache needs to be adjusted (maintained) over time as the forwarding tables (or other pertinent data or tables) are changed.

Figure 5A:
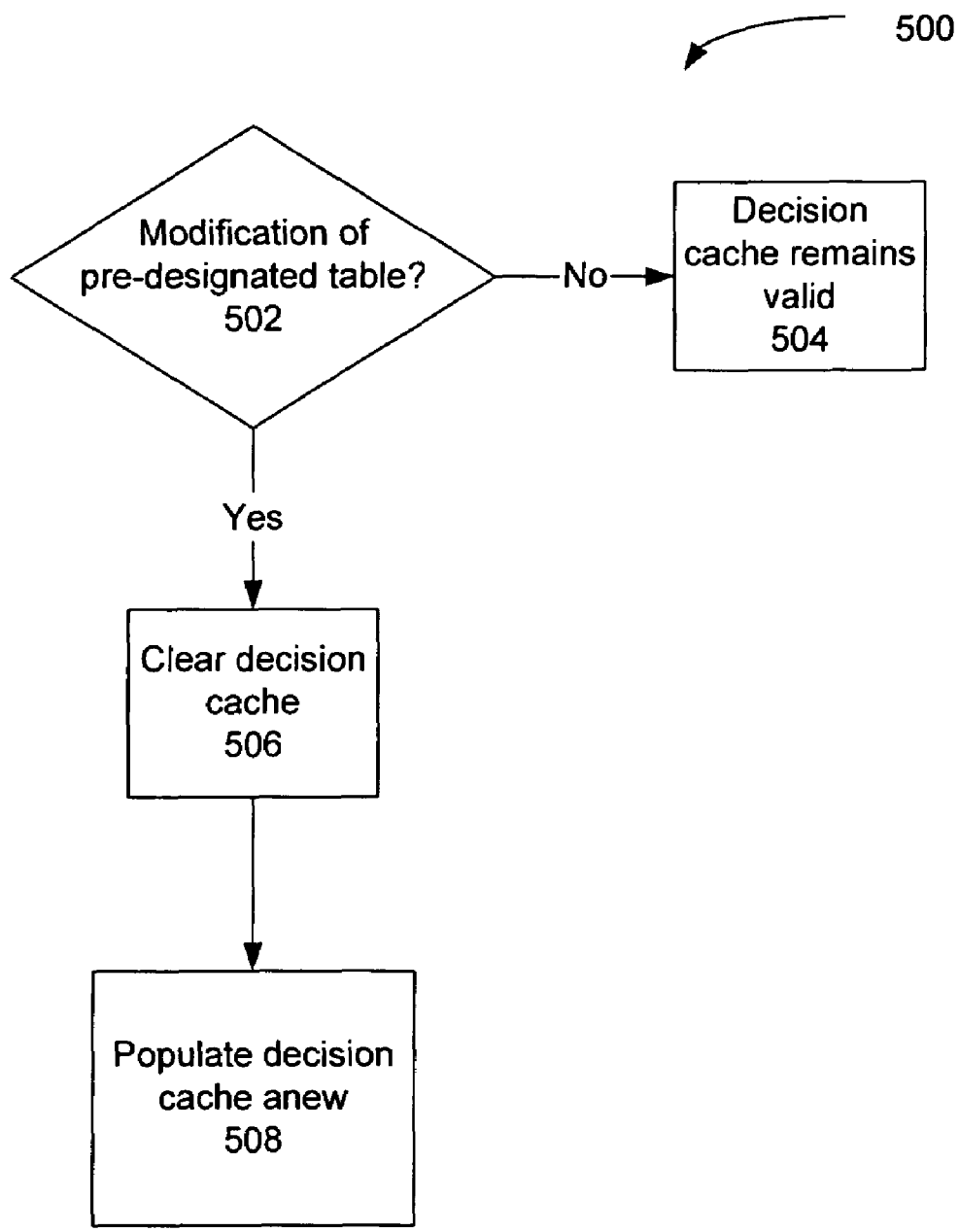
FIG. 5A is a flow chart depicting a process for maintaining a decision cache in accordance with an embodiment of the invention.

FIG. 5A is a flow chart depicting a process 500 for maintaining a decision cache in accordance with an embodiment of the invention. In this example, a determination 502 is made as to whether any one of the forwarding tables or other pertinent data is modified. In one specific implementation relating to NAT functionality, the determination 502 may cover the following tables: NAT; ACL; Layer 3 forwarding table; and Layer 2 forwarding tables. If none of the forwarding tables are modified, then the decision cache remains valid 504 so use of it continues. On the other hand, if one of the forwarding tables is modified, then the decision cache is cleared 506 and subsequently re-populated 508, if possible, as later received packets are processed. This maintenance process 500 is advantageously straightforward. In one specific implementation relating to NAT functionality, the decision cache is cleared out any time any of the following tables are changed: NAT; ACL, Layer 3 forwarding table, and Layer 2 forwarding tables.

Figure 5B:
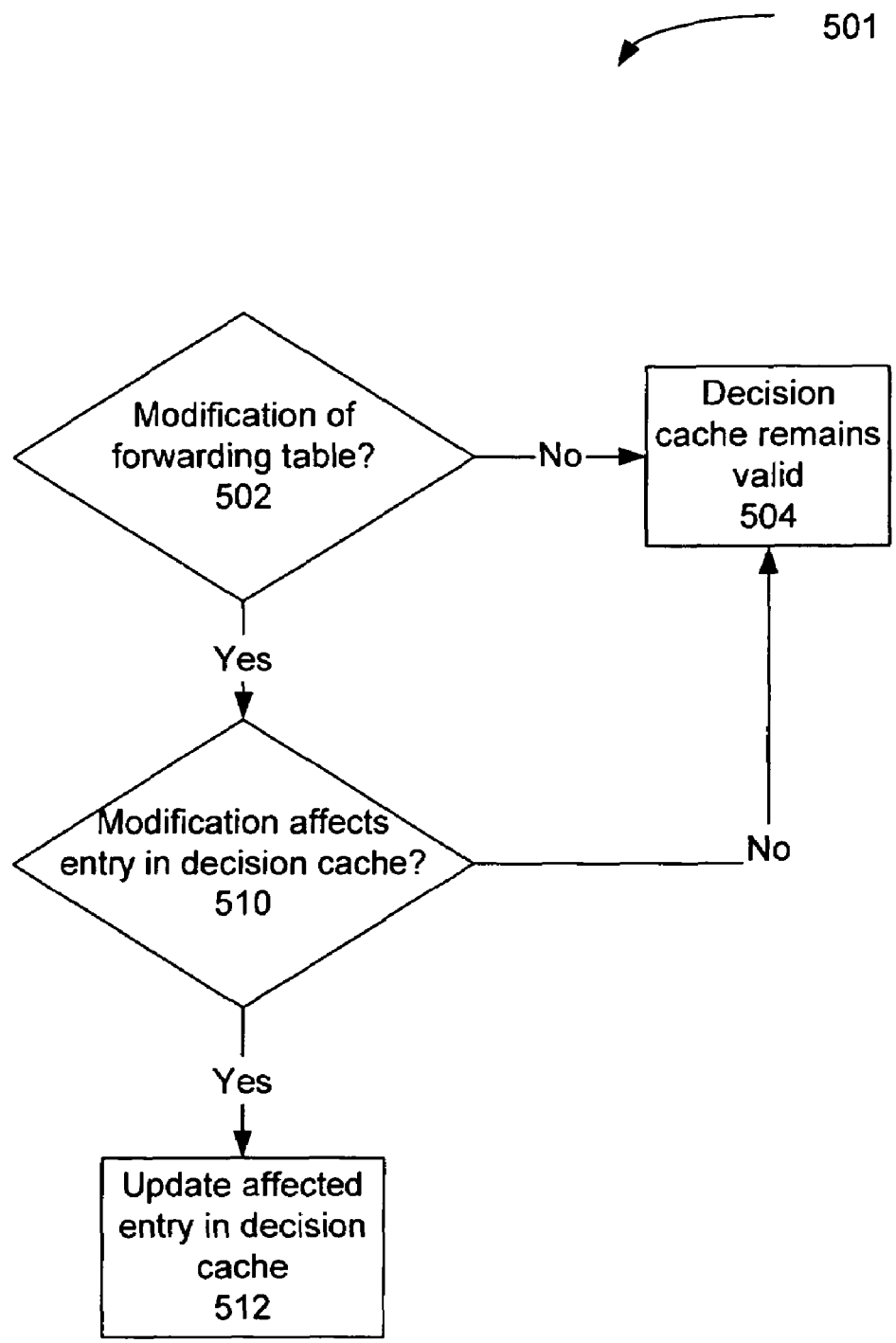
FIG. 5B is a flow chart depicting another process for maintaining a decision cache in accordance with an embodiment of the invention.

FIG. 5B is a flow chart depicting another process 501 for maintaining a decision cache in accordance with an embodiment of the invention. Again, a determination 502 is made as to whether any one of the pertinent forwarding tables is modified, and if none of the forwarding tables are modified, then the decision cache remains valid 504 so use of it continues. Here, however, if one of the forwarding tables is modified, then the decision cache makes a further determination 510 as to whether the modification affects one entry (or multiple entries) in the decision cache. If none of the entries are affected, then the decision cache remains valid 504 so use of it continues. On the other hand, if at least one of the entries in the decision cache is affected, then each affected entry is cleared or updated 512 in the decision cache so as to reflect the updated table information. This maintenance process 501 may be advantageously configured to be more efficient than the process 500 of FIG. 5A.

Figure 7:
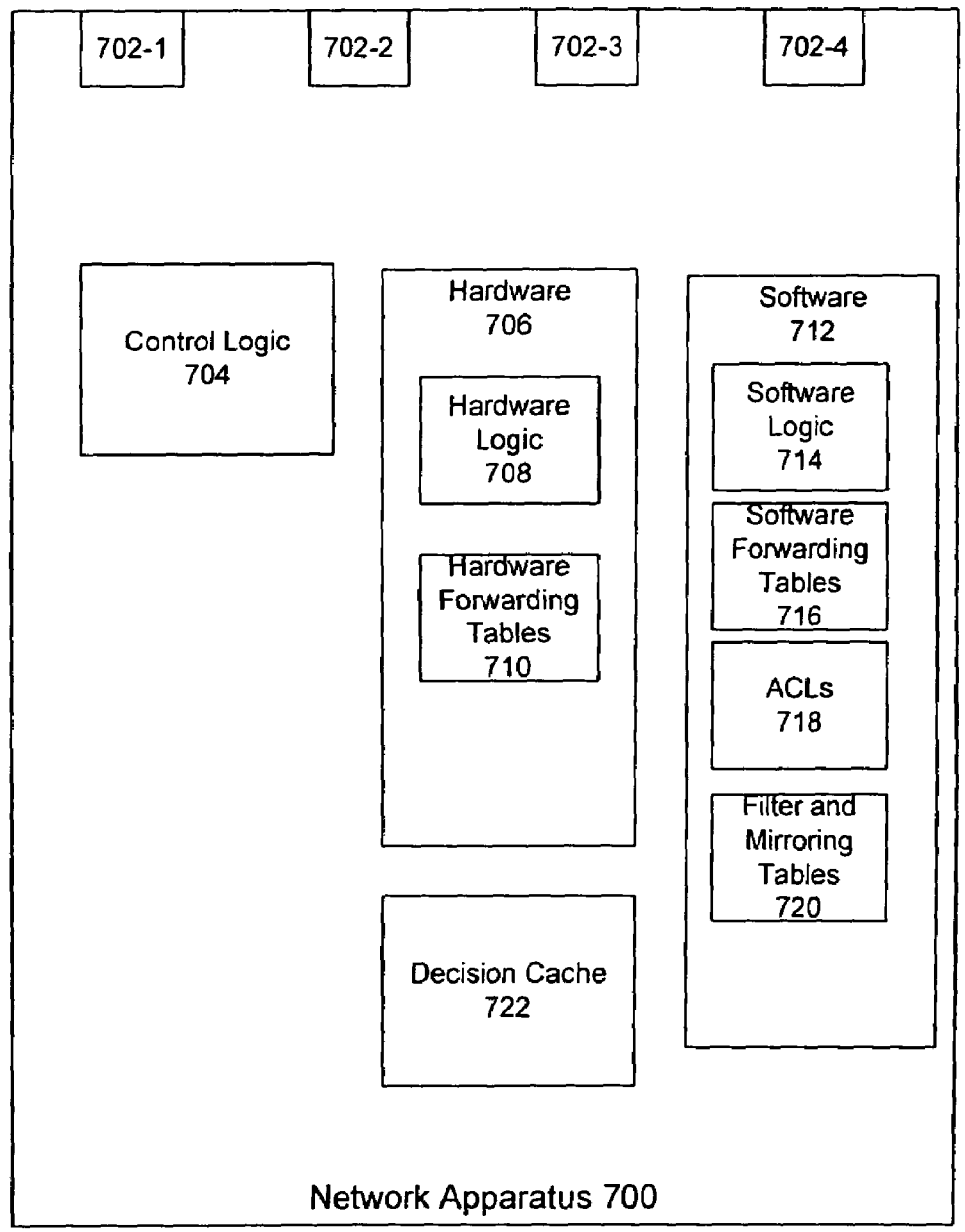
FIG. 7 is a schematic diagram depicting a networking apparatus in accordance with an embodiment of the invention.
Figure 8:
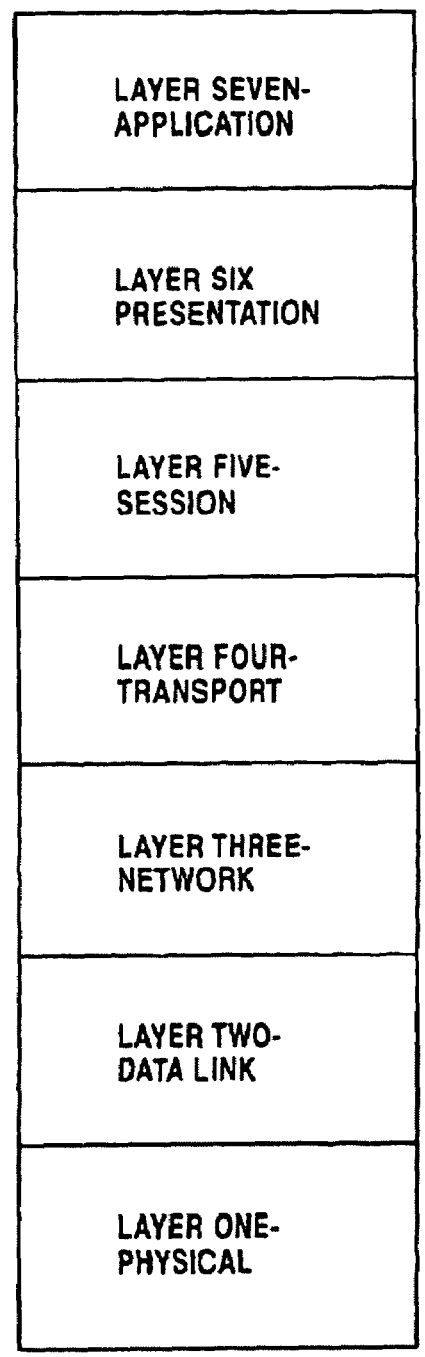
FIG. 8 is an illustration of the OSI seven layer reference model.

FIG. 7 is a schematic diagram depicting a networking apparatus 700 in accordance with an embodiment of the invention. The apparatus 700 as shown includes multiple ports 702 for communication with other networking devices. For example, packets may be received and transmitted via these ports 702. While four ports are shown, the apparatus may be configured with any number of ports.

The apparatus 700 further includes control logic 704 for directing the operation of the apparatus, hardware 706 for processing certain packets as described above, and software 712 for processing packets not resolved by the hardware 706. The hardware 706 includes hardware logic 708 and hardware forwarding tables 710. The software 712 includes software logic 714, software forwarding tables 716, access control lists (ACLs) 718, and filter and mirroring tables 720. Note that the hardware forwarding tables 710 are typically orders of magnitude smaller than the corresponding software forwarding tables 716.

As described above, a decision cache 722 is advantageously included and utilized to speed the performance of the apparatus 700 in processing certain packets by more quickly determining the action required for those packets.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of processing a data packet by a networking switch, the method comprising:
   receiving the data packet at a network device;
   determining whether a multiple-key decision cache is hit by the data packet;
   applying at least one cached action if the decision cache is hit;
   processing the data packet using software routines if the decision cache is missed;
   determining whether action performed by the software routines is programmable into the multiple-key decision cache; and
   programming a new entry into the multiple-key decision cache if the action performed is programmable,
   wherein the new entry indexes into the multiple-key decision cache, and programming the new entry does not involve storing the data packet, and
   wherein said cached action comprises network address translation of the data packet.

2. The method of claim 1, further comprising, prior to determining whether the multiple-key decision cache is hit:
   determining whether hardware circuitry of the network device is capable of processing the data packet; and
   processing the data packet using the hardware circuitry if the hardware circuitry is determined to be capable.

3. The method of claim 1, wherein a hash value relating to multiple fields in the data packet is used in programming the new entry.

4. The method of claim 1, wherein determining whether the multiple-key decision cache is hit comprises:
   generating a hash value from multiple fields in the data packet; and
   using the hash value generated to index into the multiple-key decision cache.

5. The method of claim 4, wherein the hash value is generated by applying an exclusive-or operation to a source IP address and a destination IP address in the data packet.

6. The method of claim 4, wherein
   if the hash entry is valid in the multiple-key decision cache, then determining whether pertinent fields of the data packet exactly match corresponding fields of the entry; and
   if the pertinent fields exactly match, then providing a result that the decision cache is hit.

7. The method of claim 1, wherein search keys for the decision cache include source and destination IP addresses.

8. The method of claim 7, wherein the search keys further include an inbound VLAN identifier.

9. The method of claim 1, search keys for the decision cache include source MAC addresses.

10. The method of claim 1, wherein if a modification of a pertinent table is detected, then the decision cache is cleared and populated if possible.

11. The method of claim 10, wherein the pertinent table comprises a table from a group of tables including a network address translation (NAT) table, an access control list (ACL), a network layer 3 forwarding table, and a network layer 2 forwarding table.

12. The method of claim 1, wherein if a modification of a forwarding table is detected, then the decision cache is cleared.

13. The method of claim 1, wherein if a modification of a pertinent table is detected, then a corresponding entry in the decision cache is cleared.

14. The method of claim 1, wherein if a modification of a pertinent table is detected, then a corresponding entry in the decision cache is updated.

15. A network switching apparatus comprising:
   a plurality of ports configured to receive data packets;
   software routines configured to process the data packets;
   a multiple-key decision cache including multiple key fields and action(s) corresponding thereto; and
   logic configured to determine whether the multiple-key decision cache is hit by a data packet, to apply at least one cached action if the decision cache is hit, and to process the data packet using the software routines if the decision cache is missed, and further to determine whether action performed by the software routines is programmable into the multiple-key decision cache, and to program a new entry into the multiple-key decision cache if the action performed is programmable, wherein the new entry indexes into the multiple-key decision cache, and programming the new entry does not involve storing the data packet,
   wherein said cached action performed comprises network address translation of the data packet.

16. The apparatus of claim 15, further comprising:
   hardware configured to rapidly process a subset of the data packets; and
   hardware logic configured to determine whether the hardware circuitry is capable of processing the data packet, and to process the data packet using the hardware circuitry if the hardware circuitry is determined to be capable, prior to determining whether the multiple-key decision cache is hit.

17. A method of processing a data packet by a networking switch, the method comprising:

receiving the data packet at a network device;

determining whether hardware of the network device is capable of processing the data packet;

if the hardware circuitry is determined to be capable, then processing the data packet using the hardware;

otherwise, determining whether a decision cache is hit by the data packet;

applying at least one cached action if the decision cache is hit;

processing the data packet using software routines if the decision cache is missed;

determining whether action performed by the software routines is programmable into the multiple-key decision cache; and programming a new entry into the multiple-key decision cache if the action performed is programmable, wherein the new entry indexes into the multiple-key decision cache, and programming the new entry does not involve storing the data packet, wherein said cached action comprises network address translation of the data packet.

18. The method of claim 17, wherein a hash value relating to multiple fields in the data packet is used in programming the new entry, wherein if the hash value matches an entry in the multiple-key decision cache, then determining whether pertinent fields of the data packet exactly match corresponding fields of the entry, and wherein if the pertinent fields exactly match, then providing a result that the decision cache is hit.

19. The method of claim 18, wherein the hash value is generated by applying a hash function to source and destination IP addresses.

* * * * *